(12) United States Patent  (10) Patent No.: US 6,322,041 B1
Schmeichel  (45) Date of Patent: Nov. 27, 2001

(54) ROLLING MOUNT FOR AN ELECTRIC MOTOR USED TO ROLL AND UNROLL TRUCK TARPAULINS

(75) Inventor: Charles Milton Schmeichel, Jamestown, ND (US)

(73) Assignee: Agri-Cover, Inc., Jamestown, ND (US)

( * ) Notice: Subject to any disclaimer, the term of this patent is extended or adjusted under 35 U.S.C. 154(b) by 0 days.

(21) Appl. No.: 09/363,486

(22) Filed: Jul. 29, 1999

(51) Int. Cl.[7] ............................ F16M 1/00; F16M 11/00; F16M 3/00; F16M 5/00; F16M 7/00
(52) U.S. Cl. .............................................. 248/646; 296/98
(58) Field of Search .................................. 248/646, 660, 248/662, 657, 651; 296/98, 100.14, 100.45

(56) References Cited

U.S. PATENT DOCUMENTS

| | | | |
|---|---|---|---|
| 1,526,045 | * 2/1925 | Brown | 248/657 |
| 4,012,021 | * 3/1977 | Duceppe | 248/651 |
| 4,098,477 | * 7/1978 | Perez | 248/657 |
| 4,201,254 | * 5/1980 | Fehric | 248/662 |
| 4,529,098 | * 7/1985 | Heider et al. | 296/98 |
| 4,668,007 | 5/1987 | Sloan | 296/136 |
| 4,915,439 | * 4/1990 | Cramaro | 296/98 |
| 5,002,328 | * 3/1991 | Michel | 296/98 |
| 5,067,767 | 11/1991 | Biancale | 296/100 |
| 5,180,203 | * 1/1993 | Goudy | 296/98 |
| 5,388,882 | 2/1995 | Russell et al. | 296/98 |

OTHER PUBLICATIONS

Agri–Cover Inc., Jan. 1999, SRT–2 Electric Brochure.

* cited by examiner

Primary Examiner—Ramon O. Ramirez
Assistant Examiner—J. DeLuca
(74) Attorney, Agent, or Firm—Curtis V. Harr

(57) ABSTRACT

A method of employing an electric motor that is used to roll and unroll tarpaulin covers that is mounted to the front portion of a belly dump trailer in a fashion that allows it to move both fore and aft as the tarpaulin is rolled over the trailer box is provided. This mounting of the motor is primarily accomplished by the use of a pair of tubular slide rails that are horizontally positioned above a cross member of the trailer frame. The mounting of the electric motor to these slide rails is accomplished by the use of a pair of tubular motor runners that fit over the slide rails prior to the mount's final assembly. This design allows the electric motor assembly to move freely fore and aft within the confines of the horizontal slide rails. The motor assembly is then connected through a universal joint to the solid drive shaft which is connected through an additional universal joint to the tarpaulin roll tube. The use of the solid drive shaft shifts the compensation mechanism for the varying distance between the front of the roll tube and the electric motor mount assembly during the rolling and unrolling of the tarpaulin from the drive shaft to the mount assembly itself.

13 Claims, 3 Drawing Sheets

ROLLING MOUNT FOR AN ELECTRIC MOTOR USED TO ROLL AND UNROLL TRUCK TARPAULINS

BACKGROUND OF THE INVENTION

The present invention relates to an improvement in a covering device employed by truck trailers with an open top configuration used for the transportation of loose materials. More specifically, to a device which makes the covering of the open box of a belly dump type trailer with a tarpaulin much more effective and with less chance of down time due to damage or breakdown.

A belly dump trailer is a type of open top trailer that is most commonly used to transport construction materials such as sand and gravel. The name "belly dump" comes from the manner in which the material that is being transported is emptied from the box of the vehicle. The belly dump trailer's open box extends downward below the lowest surface of the trailer frame and this extension is open to the surface beneath the trailer. This opening is closed off by the use of a pair of pivotally mounted clam-type doors that can be hydraulically opened and closed by the operator of the vehicle. Thus, when the load being carried by the trailer is to be dumped, the doors are opened and the material contained in the trailer's box is dropped to the ground below.

The problem with this style of load carrying trailer is that it is most commonly used to transport loose materials and federal, state, or local law often requires that such loads are covered during transport. This, in and of itself, does not pose a significant problem as there are many available styles of tarpaulin covers specifically designed for use with all types of trailers. The problem with covering loads carried within belly dump trailers stems instead from the use of electric drive motors commonly employed to roll and unroll the tarpaulin over the load.

The method commonly employed to roll and unroll the tarpaulin is to install an electric drive motor on the front portion of the belly dump trailer. This electric motor is connected to the roll tube (the device used to direct and store the tarpaulin in the rolling and unrolling process) by the use of drive shaft that contained a universal joint at either end. The purpose of these universal joints is to compensate for both the varying angles created between the drive motor and roll tube as the roll tube passes over the load box and the differences in the longitudinal axis of the drive motor and the roll tube. This problem is a result of the respective locations of these two components as the drive motor is most commonly mounted on the trailer frame well below the roll tube.

This design works well in compensating for these specific variables but there is another variable relationship created in this application. The final variable is a result of the fact that the distance between the electric drive motor and the leading edge of the roll tube is shorter when the roll tube is located at the center of the box than it is when the roll tube is located at either side of the box. In the past, this problem was dealt with by the use of a telescoping drive shaft that either expanded or contracted depending on the position of the roll tube. The problem with this design is that, by its very nature, the telescoping drive shaft created a weak point in the drive mechanism that was often the source of operation down time due to its failure.

From the foregoing discussion, it can be seen that it would be desirable to provide a method that eliminates the use of telescoping drive shafts commonly employed to roll and unroll tarpaulins that are used to cover loads carried in belly dump trailers. The replacement of the telescoping drive shaft would improve the efficiency of these load covering systems by decreasing the amount of down time encountered in replacing or repairing broken or damaged drive shafts that are used in this application today.

SUMMARY OF THE INVENTION

It is the primary objective of the present invention to provide a means of rolling and unrolling the tarpaulins that are employed in covering the open load carrying box of belly dump trailers used to haul large loads of loose materials such as sand and gravel.

It is a further objective of the present invention to provide such method of rolling and unrolling tarpaulins used to cover the loads carried by belly dump trailers that employs the use of a solid drive shaft that will eliminate the breakage and damage problems commonly encountered with the use of telescoping drive shafts.

It is still a further objective of the present invention to provide a means for unrolling the tarpaulin that employs an electric motor mount that allows the motor to move freely forward and rearward as the tarpaulin is rolled and unrolled over the box of the trailer.

These objectives are accomplished by the use of an electric motor that is used to roll and unrolled tarpaulin covers that is mounted to the front portion of a belly dump trailer in a fashion that allows it to move both forward and rearward as the tarpaulin is rolled over the trailer box. This mounting of the motor is primarily accomplished by the use of a pair of tubular slide rails that are horizontally positioned above a cross member of the trailer frame. The horizontal positioning of the slide rails is accomplished by the use of a vertical bracket mount. This mount is bolted at its lower end to the frame cross member and extends upward to the point at which the slide rails are permanently attached. From this point of attachment to the vertical mount, the slide rails extend forward (in relation to the body of the trailer) until they terminate at the mounting bracket of invention's electrical plug.

The mounting of the electric motor to these slide rails is accomplished by the use of a pair of tubular motor runners that fit over the slide rails prior to the mount's final assembly. These motor runners are then free to move up and down the length of the slide rails. The electric motor and gear reduction assembly is then fixedly attached to the upper surfaces of the motor runners. Additionally, the invention's electrical supply is supplied by a plug bracket through an electrical feed that is of a sufficient length to avoid interference with the movement of the motor assembly. Thus, this design allows the electric motor assembly to move freely forwards and rearwards within the confines of the horizontal slide rails. Additionally, this method of mounting the motor assembly provides sufficient stability for the motor to withstand the torque forces that are generated during the rolling and unrolling of the tarpaulin used to cover the box of the belly dump.

The gear reduction element of the motor assembly is then connected through a universal joint to the solid drive shaft which is connected through an additional universal joint to the tarpaulin roll tube. The use of the solid drive shaft shifts the compensation mechanism for the varying distance between the front of the roll tube and the electric motor mount assembly during the rolling and unrolling of the tarpaulin from the drive shaft to the electric motor mount assembly itself. The use of the slide rails and motor runners in the construction of the electric motor mount assembly enables it to provide the compensation mechanism as it allows the motor assembly to freely slide forward and rearward during the operation of the invention. Thus, the problems associated with the use of a telescoping drive shaft as a compensation mechanism are entirely avoided.

For a better understanding of the present invention reference should be made to the drawings and the description in which there are illustrated and described preferred embodiments of the present invention.

DESCRIPTION OF THE PREFERRED EMBODIMENT

Figure 1:
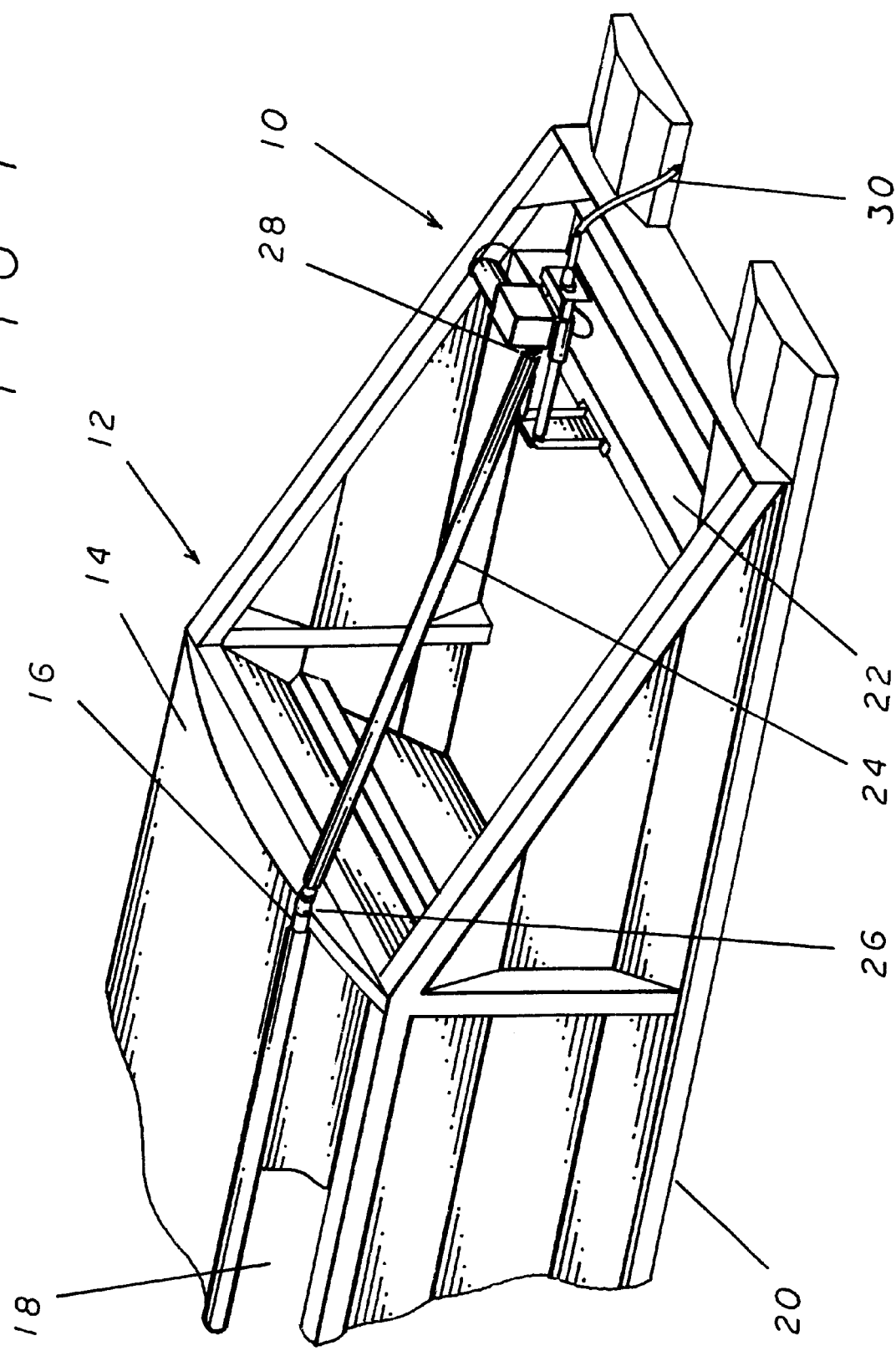
FIG. 1 is a perspective view of the present invention showing the manner of its use in conjunction with a belly dump trailer.

Referring now to the drawings, and more specifically to FIG. 1, the sliding electric motor mount 10 is designed primarily for use with a belly dump trailer 12 but it is important to note that it can be employed in conjunction with other open box 18 type vehicles. The belly dump trailer 12 is a load carrying device that is basically made up of a frame 20 which surrounds an open load box 18. The open load box 18 is generally used to transport large loads of loose material such as sand and gravel. As it is often necessary to cover these loads during transportation, a tarpaulin 14 is generally employed that has a method of automatically rolling and unrolling it over the box 18. This is generally accomplished with the use of a roll tube 16 which is employed both to store the tarpaulin 14 when it is not covering the trailer box 18 and to guide the tarpaulin 14 over the box 18 during the covering process.

The roll tube 16 is connected to the present invention by the use of the drive tube 24. The connection between the roll tube 16 and the drive tube 24 is made by the upper universal joint 26 which allows the rotational axis of the roll tube 16 to be different than the rotational axis of the drive tube 24. Additionally, the most forward end of the drive tube 24 is connected to the drive motor assembly 58 of the present invention with the use of the lower universal joint 28 which allows the rotational axis of the drive tube 24 to be different than that generated by the motor of the invention. The use of the upper and lower universal joints, 26 and 28, is necessary because not only is the present invention generally mounted on the frame cross member 22 well below the level of the roll tube 16, but also because the angles of the individual components vary as the roll tube 16 passes over the open box 18 of the belly dump trailer 12. Finally, power and control are supplied to the invention through the power cable 30 which extends from the cab of a towing vehicle to the most forward point of the invention.

Figure 2:
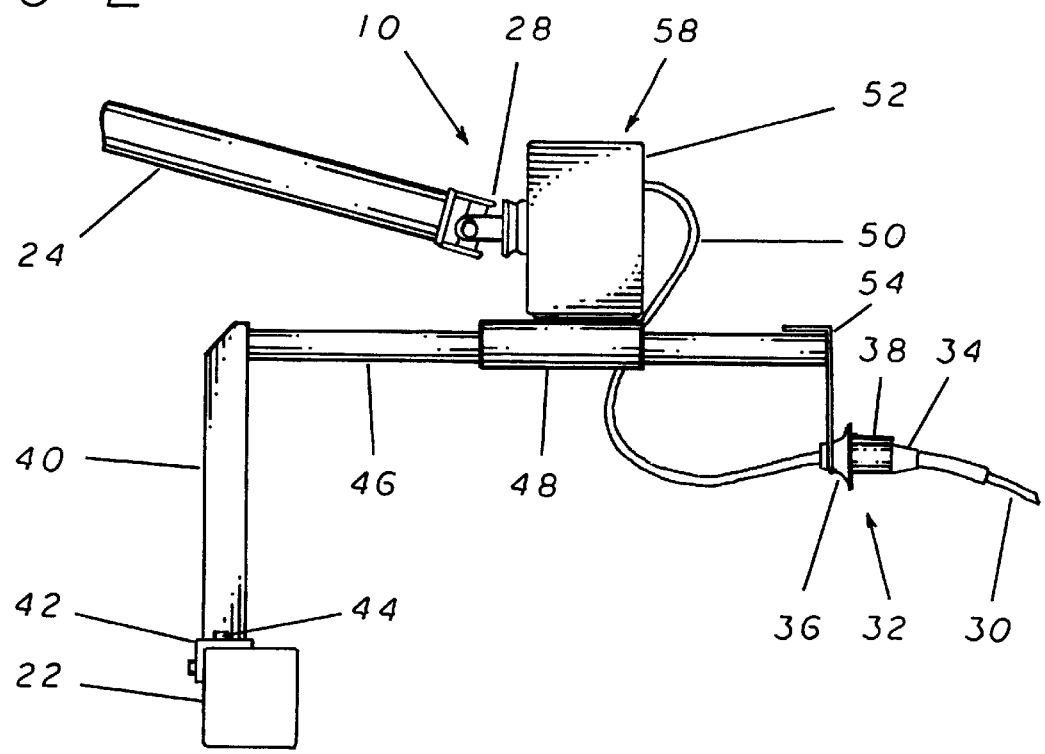
FIG. 2 s a side elevation view of the present invention showing the manner in which the drive motor assembly is mounted to the horizontal rail components of the motor mount assembly.
Figure 3:
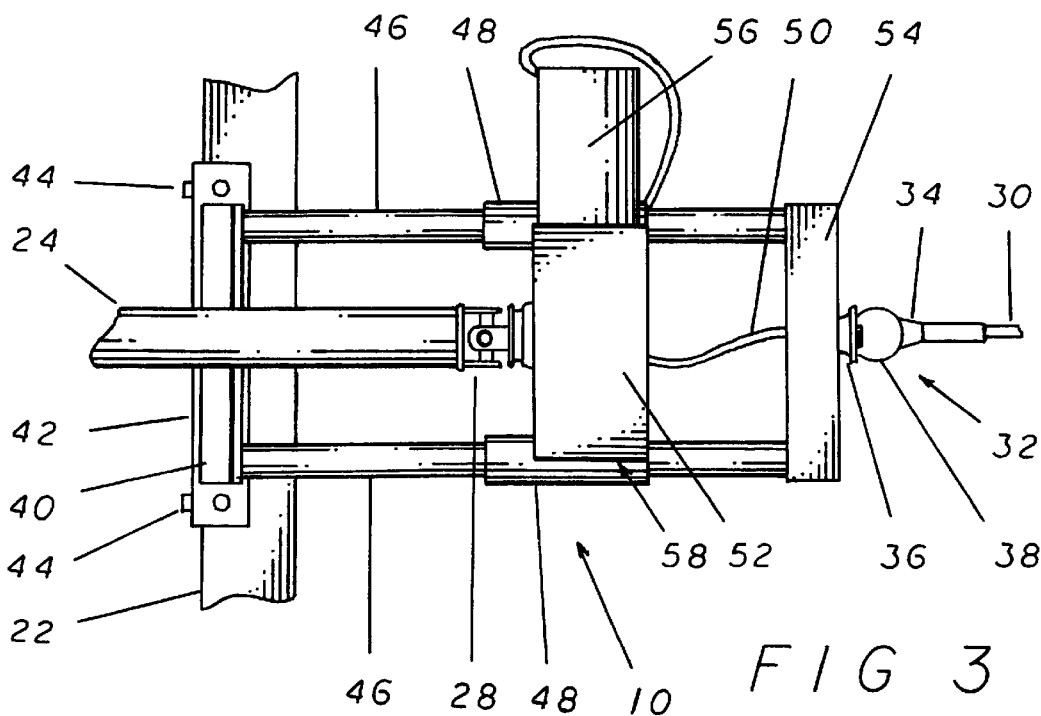
FIG. 3 is a top elevation view of the present invention showing the manner in which the drive motor assembly is mounted to the horizontal slid rail components of the motor mount assembly.

The method of construction of the present invention is illustrated in FIGS. 2 and 3. The sliding electric motor mount 10 is made up of a vertically positioned mount bracket 40 that is attached to the upper surface of the trailer frame cross member 22. This attachment is made by the use of an angle iron bracket mount 42 which is fixedly attached to the lowest surface of the mount bracket 40. The angle iron bracket 42 fits over the upper and rearward corner of the frame cross member 22 and is held in place there by a plurality of bracket mount bolts 44 that are threaded down into the cross member 22. This method of attachment for the vertical mount bracket 40 ensures a solid mounting point for the rest of the components of the present invention.

The upper end of the vertical mount bracket 40 provides the point of attachment for the two horizontally mounted tubular slide rails 46. The tubular slide rails 46 extend forward (in relation to the belly dump trailer 12) from this point of attachment to terminate at the plug bracket 54. The plug bracket 54 caps off the terminal ends of the slide rails 46 and provides the point of attachment for the power quick release plug 32. The quick release plug 32 allows for the quick and easy connection of the invention to the power supply of the towing vehicle through the power cable 30.

The quick release plug 32 is made up of primarily the male power plug 34 and the female power plug 36, the latter of which is permanently attached to the lower part of the plug bracket 54. The male plug 34 (which forms the most rearward portion of the power cable 30) fits into the female plug 36 to make the electrical connection between the present invention and the towing vehicle. The female power plug 36 is also equipped with a spring loaded plug cover 38 that covers the opening of the female plug 36 when the male plug 34 is not connected to the female plug 36. The purpose of the plug cover 38 is to ensure that no moisture can enter the female plug 36 when the male plug is not connected to the female plug 36. Additionally, the plug cover 38 can also be pivoted up and out of the way to allow for the insertion of the male plug 34 when a connection between the invention and the towing vehicle is desired. Finally, power from power cable 30 and power quick release plug 32 is transferred to the body of the invention by the power transfer cable 50 which runs from the front of the quick release plug 32 to the drive motor housing 56 and is of a sufficient length to allow for the free movement of the drive motor assembly 58 through the length of the slide rails 46.

The actual mounting of the drive motor housing 56 and the gear reduction housing 52 to the tubular slide rails 46 is accomplished through the use of the motor runners 48. The motor runners 48 are a pair of metallic tubes that are slightly larger in their inside diameter than the outside diameter of the slide rails 46. The motor runners 48 are slid over the slide rails 46 prior to the final assembly of the invention and are left free to slide up and down the length of the slide rails 46. Therefore, the motor runners 48 (in conjunction with the slide rails 46) are the component of the present invention which provide the adjustment mechanism to compensate for the varying distance between the roll tube 16 and the slide rails 46 as the tarpaulin 14 is rolled and unrolled.

The drive motor assembly 58 straddles the distance between the two motor runners 48 and is permanently attached to their upper surfaces. The drive motor assembly 58 is made up of the drive motor housing 56 and the gear reduction housing 52. The drive motor housing 56 contains the drive motor which provides the rotational force necessary to roll and unroll the tarpaulin through the drive tube 24. The drive motor is connected to the gear reduction unit located within the gear reduction housing 52. The purpose of the gear reduction unit is to take the rotational force generated by the drive motor and multiply it through a series of gears. This allows the rotational force applied to the drive tube 24 to be greater than that generated by the drive motor 58 which enables the invention to operate at a higher degree of efficiency.

Figure 4:
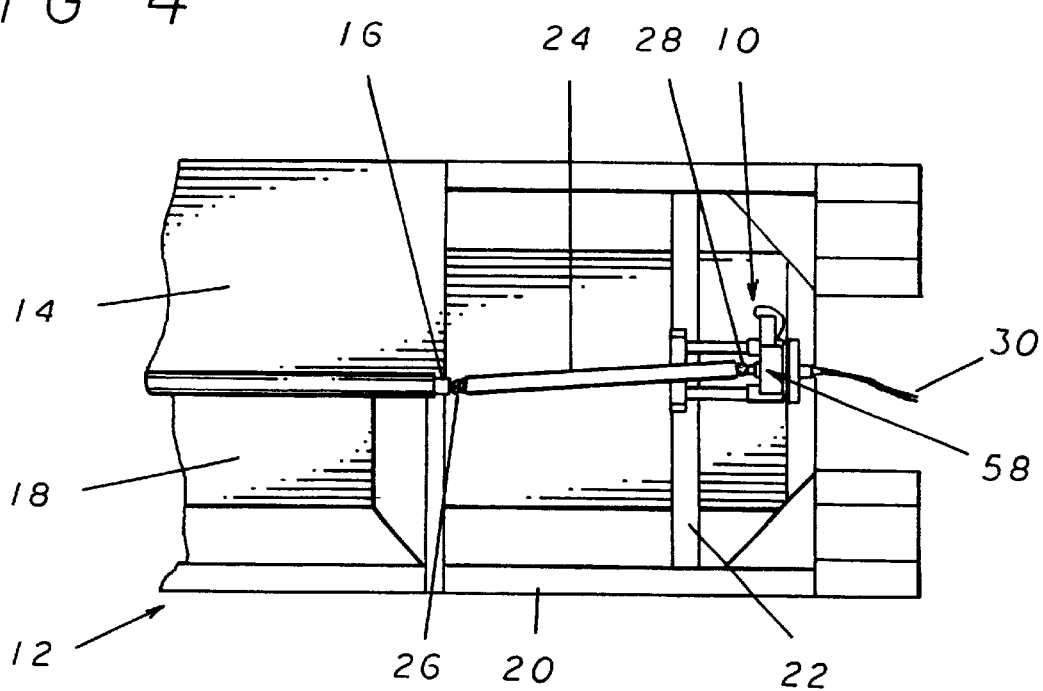
FIG. 4 is a top elevation view of the present invention showing it as attached to a belly dump trailer and illustrating the positioning of the electric motor on the slide rails when the tarpaulin is covering appoximately half of the open box and the most forward end of e tarpaulin roll tube is at its closest point to the mount assembly.
Figure 5:
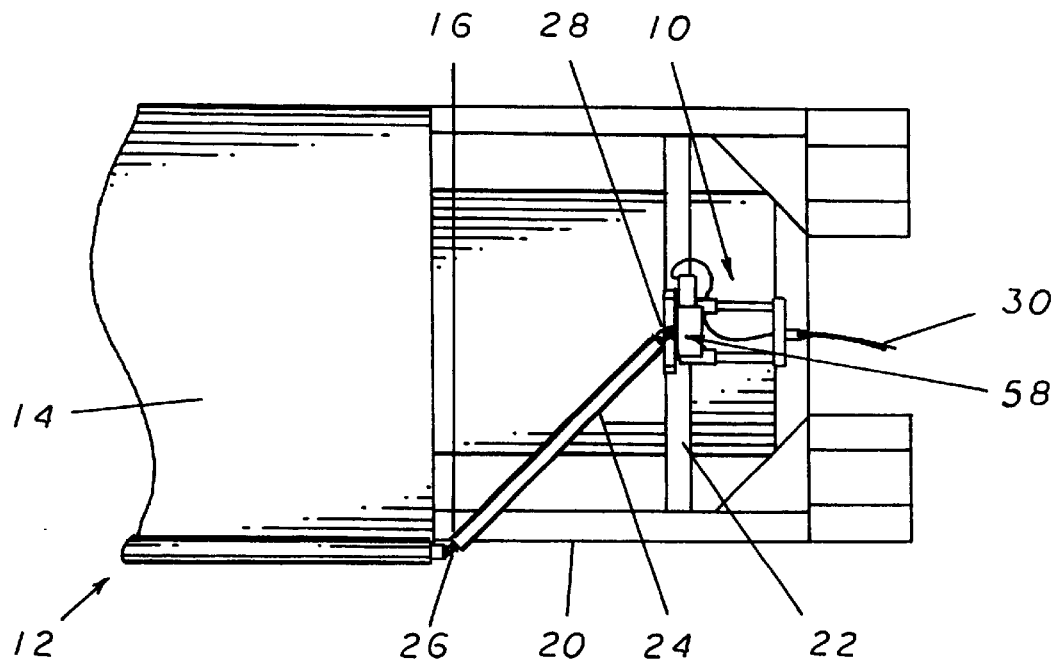
FIG. 5 is a top elevation view of the present invention showing it as attached to a belly dump trailer and illustrating the positioning of the electric motor on the slide rails when the tarpaulin is covering all of the open box and the most forward end of the tarpaulin roll tube is at its furthest point from the mount assembly.

The operation of the present invention in the rolling and unrolling of a tarpaulin 14 over the open box 18 of a belly dump trailer 12 is illustrated in FIGS. 4 and 5. Specifically, FIG. 4 illustrates the position of the drive motor assembly 58 in relation to the body of the invention when the roll tube 16 and the leading edge of the tarpaulin 14 are covering approximately half of the trailer box 18. At this point, the front edge of the roll tube 16 is at its closest point to the invention. As a result, the drive motor assembly 58 is moved forward within the body of the invention in relation to the belly dump trailer 12 which compensates for the relatively close position of the roll tube 16 to the most rearward portion of the invention.

Conversely, FIG. 5 illustrates the position of the drive motor assembly 58 when the roll tube 16 and the tarpaulin 14 are completely covering the trailer 12 (it is important to note that the relationship between the roll tube 16 and the body of the invention in this position is the same when the tarpaulin 14 is rolled to expose the trailer box 18). At either of these points, the front edge of the roll tube 16 is at its furthest point from the body of the invention. As a result of this, the drive motor assembly is moved rearward within the body of the invention in relation to the belly dump trailer 12. This motion compensates for the relatively distant position of the roll tube 16 to the most rearward portion of the invention.

Thus, the movable nature of the drive motor assembly 58 within the body of the invention allows for the compensation of the variable distance between the roll tube 16 and the invention during the tarpaulin 14 rolling and unrolling processes. Additionally, the present invention provides for this compensation while still allowing for the use of a solid, and more reliable, drive tube 24 to transfer the rotational power generated by the drive motor to the roll tube 16 and the tarpaulin 14.

Although the present invention has been described in considerable detail with reference to certain preferred versions thereof, other versions are possible. Therefore, the spirit and scope of the appended claims should not be limited to the description of the preferred versions contained herein.

What is claimed is:

1. A sliding electric motor mount for use on a trailer having a trailer box with a front and a rear end, a front and rear box side, a left and right box side, said box sides defining a substantially rectangular open section, a rectangular tarpaulin attached along one edge to one of said box sides and a second edge of said tarpaulin connected to a roll tube for rolling and unrolling said tarpaulin over said rectangular open section of said sliding electric motor mount comprising:

a left and a right rail section for fixedly mounting to said trailer;

a motor slidably mounted to said rail section such that said motor may slide on a plane parallel to said roll tube; and a drive tube having a first end attached to said motor and a second end for attachment to said roll tube.

2. A sliding electric motor mount as in claim 1, further comprising a gear reduction section attached to said motor between said motor and said drive tube.

3. A sliding electric motor mount as in claim 2, wherein said left and right rail section is an elongated tubular section.

4. A sliding electric motor mount as in claim 3, wherein said motor is mounted to said rail sections with a left and right tubular motor runner for slidably connecting to said elongated tubular sections.

5. A sliding electric motor mount as in claim 4, wherein said drive tube is connected to said gear reduction section with a universal knuckle.

6. A sliding electric motor mount as in claim 5, wherein said drive tube further comprises a universal knuckle for attachment to said roll tube.

7. A sliding motor mount for use on a trailer having a trailer box with a front and a rear end, a front and rear box side, a left and right box side, said box sides defining a substantially rectangular open section, a rectangular tarpaulin attached along one edge to one of said box sides and a second edge of said tarpaulin connected to a roll tube for rolling and unrolling said tarpaulin over said rectangular open section of said sliding electric motor mount comprising:

a left and a right rail section for fixedly mounting to said trailer forward of said front end of said trailer box;

a drive tube having a first and a second end with said second end for attachment to said roll tube;

a drive means for rotating said roll tube attached to said first end of said drive tube; and a means of slidable mounting said drive means to said left and right rail sections.

8. A sliding motor mount as in claim 7, wherein said drive means is an electric motor.

9. A sliding motor mount as in claim 8, wherein said left and right rail section is an elongated tubular section.

10. A sliding motor mount as in claim 9, wherein said means of slidably mounting said drive means to said left and right rail section is a left and right tubular motor runner for slidably connecting to said elongated tubular sections.

11. A sliding motor mount as in claim 10, further comprising a gear reduction section attached to said motor between said motor and said drive tube.

12. A sliding motor mount as in claim 11, wherein and drive tube is connected to said gear reduction section with a first universal knuckle.

13. A sliding electric motor mount as in claim 12, further comprising a second universal knuckle for connecting said drive tube to said roll tube.

* * * * *